United States Patent [19]

Sharbaugh et al.

[11] 4,341,732
[45] Jul. 27, 1982

[54] NUCLEAR REACTOR DIP SEAL

[75] Inventors: John E. Sharbaugh, Bullskin Township, Westmoreland County; Joseph M. Kazan, New Stanton, both of Pa.

[73] Assignee: Westinghouse Electric Corp., Pittsburgh, Pa.

[21] Appl. No.: 43,407

[22] Filed: May 29, 1979

[51] Int. Cl.³ .............................................. G21C 13/06
[52] U.S. Cl. .................................................. 376/206
[58] Field of Search ....................... 176/38, 87, 40, 65; 220/3; 376/205, 206, 290

[56] References Cited

U.S. PATENT DOCUMENTS

| 2,995,505 | 8/1961 | Guild | 176/87 |
|---|---|---|---|
| 3,784,443 | 1/1974 | Vercusson | 176/40 |
| 3,848,423 | 11/1974 | Renaux | 176/87 |
| 3,976,541 | 8/1976 | Stitiler | 176/38 |
| 4,043,866 | 8/1977 | Durston | 176/87 |
| 4,055,465 | 10/1977 | Lemercier | 176/87 |
| 4,078,969 | 3/1978 | Garin | 176/87 |
| 4,080,254 | 3/1978 | Poindexter | 176/87 |
| 4,081,322 | 3/1978 | Aubert | 176/87 |
| 4,087,325 | 5/1978 | Chevallier et al. | 176/65 |
| 4,113,564 | 9/1978 | Garin | 176/87 |
| 4,127,444 | 11/1978 | Gama | 176/87 |

FOREIGN PATENT DOCUMENTS 2282144  3/1976  France .................................. 176/87

Primary Examiner—Sal Cangialosi
Attorney, Agent, or Firm—K. R. Bowers

[57] ABSTRACT

Arrangements for sealing cover gas from the clearance spaces among primary vessel head structure components in a liquid metal cooled fast breeder nuclear reactor including a dip seal having a trough and blade respectively suspended from adjacent head structure components, such as rotatable plugs, the trough and blade extending downward to an elevation below the operating level of coolant within the vessel. A vent pipe equalizes pressure during power operation among the separate cover gas regions formed by the dip seal.

3 Claims, 3 Drawing Figures 4,341,732

NUCLEAR REACTOR DIP SEAL

BACKGROUND OF THE INVENTION

1. Field of the Invention

This invention relates to sealing systems and more particularly to cover gas seals for components of liquid metal fast breeder nuclear reactor vessel closure heads.

2. Description of the Prior Art

In nuclear reactors, well known in the art, a vessel houses a core comprised of fuel assemblies about which a coolant is circulated. The vessel is sealed by a closure head. In certain reactors, particularly those identified as liquid metal cooled fast reactors, the closure head comprises one or more rotatable plugs. The rotatable plugs, which may be of varying sizes disposed within one another, provide remote access for refueling as well as sealing of the vessel. Since the plugs must be able to rotate relative to one another to accomplish the refueling purpose, the plugs are typically mounted so as to define an annular clearance among them. The clearance, while allowing rotation of the plugs, also establishes a potential path for release of radioactive fluid mediums, such as gases. Accordingly, seals are provided to prevent release of radioactive materials from the vessel, as well as to prevent fluid communication into the vessel from the surrounding environment. To further prevent communication of the environment, for example including oxygen, with the liquid metal coolant within the vessel, a cover gas is typically provided between the operating level of the reactor coolant and the closure head.

A typical system for sealing the reactor is taught in U.S. Pat. No. 4,078,969 which teaches a liquid metal dip seal fabricated within the rotating plugs, as well as a remotely engageable seal among riser assemblies atop the plugs. The use of dip seals is typical for this application. However, such dip seals typically require extensive auxiliary systems to control the seal fluid level, to fill and drain the seal, to purify the sealing fluid, to establish a desired temperature profile axially through the seal, and to monitor seal temperature and purity. Such support systems can require extensive maintenance as well as requiring complex design. Further, such dip seals have been located away from the reactor coolant pool to prevent contamination of the coolant by the seal fluid, and to permit the dip seal fluid to solidify in whole or in part in order to avoid loss of the dip seal fluid during an undesirable loading such as may occur during a seismic event.

It is thus desirable to provide a sealing arrangement which is simplified relative to existing designs, which provides adequate isolation among the interior and exterior of the vessel, and which further provides this protection in the unlikely event of a seismic occurrence.

SUMMARY OF THE INVENTION

This invention provides a sealing arrangement for liquid cooled, and preferably liquid metal cooled fast breeder, nuclear reactors having a cover gas between the operating level of the coolant and a closure head having an annular clearance space among the head components, which is simple to manufacture and maintain, and which assures adequate isolation during a seismic occurrence. The sealing system includes a dip seal comprised of an annular trough and a matingly sized blade positioned within the trough. The trough is suspended from, for example, an outer plug by means of an annular impermeable plate. The blade is suspended from the inner plug, also by an impermeable plate. In marked contrast to prior teachings, the trough and blade are disposed at an elevation below the operating level of the coolant pool so as to form separate plenums in the cover gas region. Being disposed below the operating level, the dip seal assures that there is no communication between the cover gas and the annular clearance space between the plugs. During maintenance such as refueling, the level of coolant, such as sodium, in the reactor vessel is lowered so that the dip seal is disposed above the coolant level. In this manner, the arrangement requires no heat source or heat control since the seal is constantly liquid and at the same temperature as the liquid metal in the coolant pool. There is no need for fill level controls since the seal fluid is fully compatible with the primary coolant, being the same fluid. Also, filling of the trough occurs automatically to match the primary coolant level and, any loss due to, for example, a seismic event during operation is instantly replaced by the pool. Purification of the seal fluid occurs by diffusion and continuous replacement of the seal fluid by the primary coolant which is purified by a separate purification system.

By providing a dip seal above the level of coolant during, for example, refueling operations, there is assurance that the cover gas plenums otherwise formed are completely intercommunicated. This allows for deactivation of the entire cover gas region prior to the start of the refueling. As the system provides separate cover gas plenums during normal operation, equalization of pressure among the plenums is maintained by vent pipes attached to the troughs.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
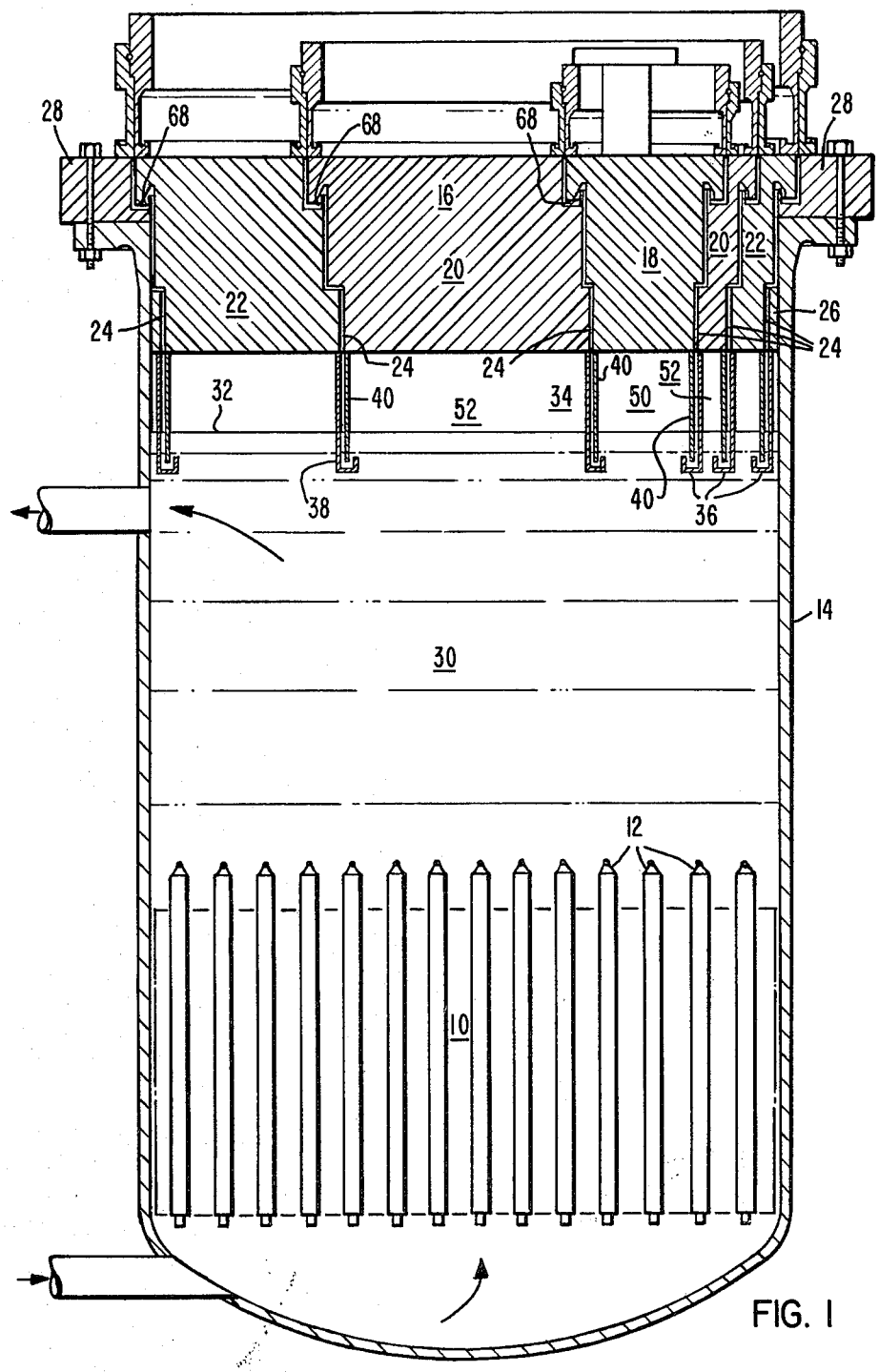
FIG. 1 is an elevation view of a nuclear reactor including the disclosed sealing arrangement.

Referring now to FIG. 1, there is schematically shown a portion of a liquid metal cooled nuclear breeder reactor in accordance with the invention. The reactor includes a core 10 of fuel assemblies 12 disposed within a vessel 14. Although the figure and exemplary embodiments represent what is commonly referred to as a loop-type nuclear reactor system, it is to be understood that the invention is equally applicable to the commonly known pool-type reactor. The vessel is sealed by a head structure 16 which includes one or more rotating components. The embodiment shown includes three rotating plugs, an inner plug 18, an intermediate plug 20 and an outer plug 22. The plugs are generally cylindrical and eccentrically arranged to allow remote refueling access, as is well known in the art. As the plugs are rotatable, a clearance space 24, generally annular, is provided among the respective plugs and, for example, between the outer plug 22 and the vessel extension 26 and between the outer plug 22 and a fixed support 28.

A liquid coolant 30, for example, a liquid metal comprising sodium, circulates through the core 10 absorbing heat energy, and discharges the heat to apparatus, not shown, typically for the ultimate purposes of electric power generation. The average liquid coolant level 32 within the vessel is substantially fixed during normal power operation, fluctuating only slightly due to turbulence, and a cover gas 34 is disposed in the volume between the liquid level upper surface 32 and the head 16. For purposes well known in the art, it is desirable to eliminate direct communication between the cover gas 34 and the clearances 24.

Figure 3:
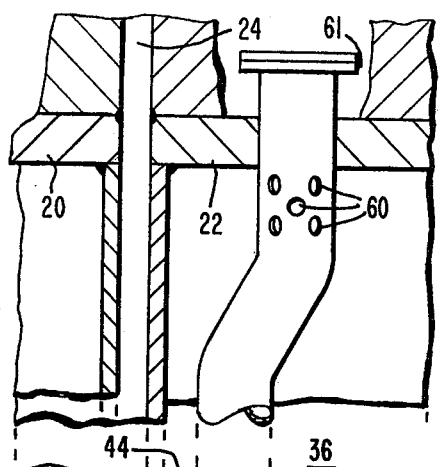
FIG. 3 is a view of a dip seal in accordance with the invention also incorporating a vent system.
Figure 3:
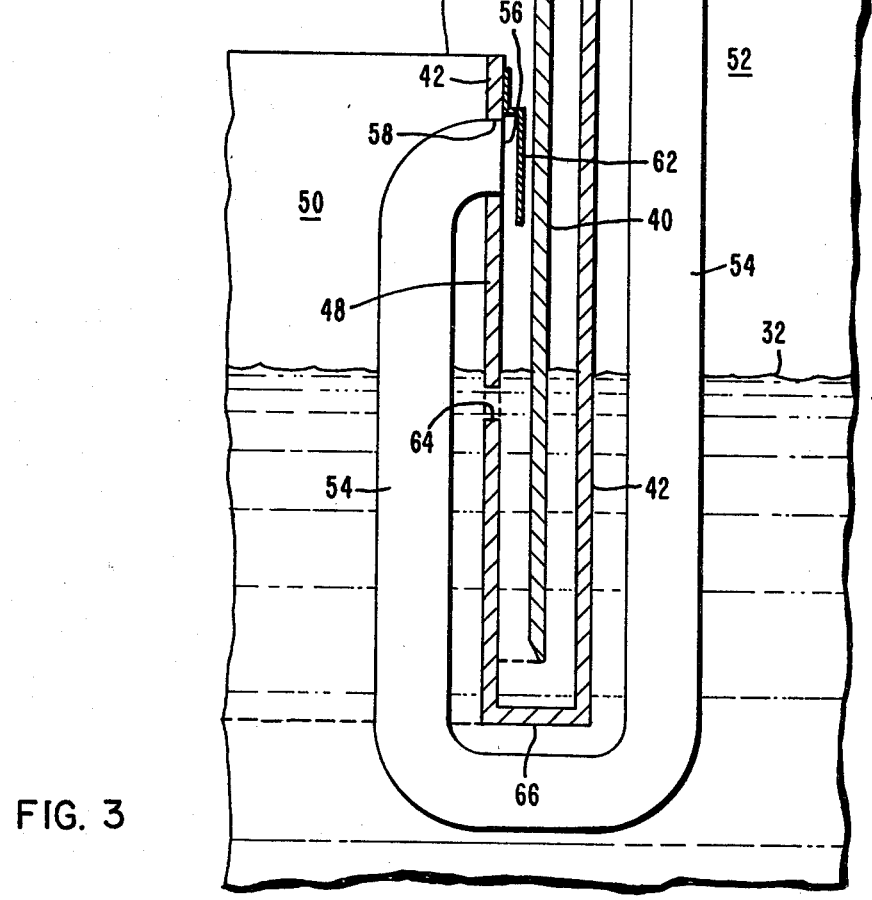

In accordance with the invention, the cover gas 34 is isolated from direct communication with the clearance spaces 24 by utilization of sealing means such as dip seals 36. Each dip seal 36 includes a cooperatively sized and positioned trough 38 and blade 40 which extend, respectively, from the components forming the annular clearance 24 to a position below the operating level of the coolant 30. The trough 38 includes, for purposes of description, a lower channel portion 42 and an upper extension 44 (FIG. 3). At least the extension 44, extending from the coolant operating level to, for example, an outer plug, is impermeable to the flow of liquids or gases therethrough, and preferably the entire trough is composed of an impermeable metal such as steel. The blade 40 is similarly comprised of an impermeable material, such as steel and, in preferred form, is suspended from an inner component such as, where the trough is suspended from the outer plug 22, the intermediate plug 20. Although shown only in elevation, the configuration of the trough 38 and of the blade 40 is generally cylindrical, corresponding to the respective annular clearance 24.

Figure 2:
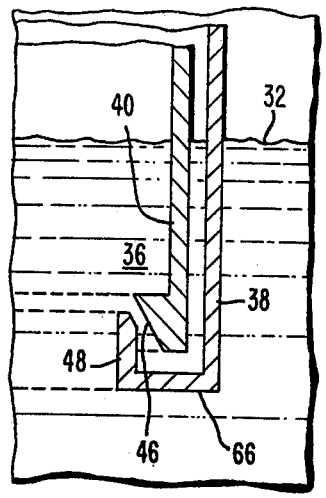
FIG. 2 is an elevation view of a dip seal in accordance with the invention.

As shown in FIG. 2, the blade 40 can include an enlarged tip 46 which extends slightly above the end 48 of the trough 38. In this configuration, the bottom of both the blade tip 46 and the trough end 48 are disposed below the coolant operating level at least a distance of three inches, and preferably approximately one foot.

As shown in FIG. 1, extension of the dip seals 36 into the coolant during operation divides the cover gas 34 into a plurality of distinct regions such as region 50 bounded, as shown in FIG. 1, radially by the blade 40, above by the plug 18, and below by the coolant surface. Region 52 laterally surrounds region 50. It is desirable to maintain intercommunication among the regions and to maintain equivalent conditions, such as pressures, among the regions. This can be accomplished through the use of means for venting one region to another such as the vent pipe 54. As shown in FIG. 3, one extremity 56 of the vent pipe 54 is affixed, through aperture 58, to the trough 38 at an elevation above the operating coolant level 32 in, for example, region 50. The vent pipe 54 is positioned to pass below the bottom of the trough 38 and extends upwardly into region 52 and includes apertures 60, also disposed above the operating level of the coolant. A cover piece 62 is preferably provided to extend over aperture 58, as shown, so as to exclude sodium coolant that might wash over the top of the trough 38 from entering the vent pipe 54. It is to be understood that a plurality of vent systems can be utilized about the circular dip seals. Additional vent systems, such as pipe structures affixed to, or through, the trough and/or blade, are equally possible. The vent system can also include structure allowing access to the interior of the vent pipe 54, such as a flange 61. The flange 61 is thus preferably disposed above the bottom of the corresponding plug or support structure, and allows access to clear the vent pipe of any obstructing material, such as coolant, which enters the pipe.

In contrast to the embodiment of FIG. 2 where the end of 48 of the trough 38 is positioned below the coolant operating level, the end 48 of the trough 38 shown in FIG. 3 extends above the coolant level 32. In the former arrangement, the coolant enters the trough over the end 48, while in the latter arrangement, one or preferably a plurality of passages 64, are provided below the coolant operating level to allow coolant entry. The latter arrangement is preferred as it is more compatible with the vent arrangement, and minimizes the diffusion or interchange of fission products from the main volume of coolant to the volume of seal fluid in the trough.

Although the vent system provides intercommunication among the cover gas regions, during reactor shutdown for operations such as refueling, the coolant level 32 is lowered by thermal contraction to an elevation below the bottom 66 of the dip seal. This fully intercommunicates the regions and provides added assurance that operations on the cover gas, such as deactivation and purification, are applied to all of the cover gas above the coolant level. Accordingly, the dip seals are preferably positioned so that the fill structures, being the upper portion of the end 48 in FIG. 2 and the passage 64 in FIG. 3, are below the operating level of the coolant, and the bottom 66 of the dip seal is above the shutdown coolant level. In, for example, a typical conceptual pool type reactor, the expected change in coolant elevation from the upper operating level to the lower refueling level as a result of thermal expansion and contraction of a sodium coolant, is about eleven inches, thus allowing a relatively large dip seal trough.

It will now be apparent to those skilled in the art that the disclosed sealing system offers substantial advantages relative to previously-used dip seal systems which were segregated from the primary reactor coolant. As the dip seal fluid is the reactor primary coolant, no separate seal fluid is required and the primary coolant purification systems also purify the seal fluid. The seal fluid is thus purified through diffusion and continuous replacement of the seal fluid with primary coolant. This additionally eliminates the need for heat sources, temperature controllers and maintenance operations associated with previous dip seal systems. Further, seal filling is automatically accomplished, requiring no controls. The disclosed sealing system also operates at a sufficiently high temperature to assure wetting of the blade and trough surfaces and, in the unlikely event of a seismic occurrence, any loss of seal fluid from the trough during power operation is immediately replaced by the primary coolant pool. The disclosed system can also be utilized in conjunction with prior art sealing arrangements, including dip seals, located within and about the head components, such as the dip seals 68 shown in FIG. 1.

It will also be apparent that many modifications and additions are possible without departing from the spirit and scope of the disclosed systems. For example, while a preferred arrangement sealingly affixes the trough to an outer member and the blade to the inner member which allows the inner member to be rotated relative to the outer member so that the blade moves freely through the seal fluid without loss of effective sealing, the blade and trough can also be respectively sealed to the outer and inner members. Many additional modifications are possible. It is thus intended that all matter contained in the foregoing description and drawings be interpreted as illustrative and not in a limiting sense.

I claim:

1. In a liquid metal cooled nuclear reactor including a vessel, an upper structure atop said vessel, a core disposed within said vessel, within said vessel a liquid coolant pool substantially filling said vessel, said liquid coolant pool having an upper surface located above said core, a cover gas disposed in a region between said coolant pool upper surface and said upper structure, said upper structure having a first component and a second adjacent component with an annular clearance space between said adjacent components, one of said components being rotatable with respect to said adjacent component, improved means for separating said cover gas from said annular clearance space comprising an annular trough affixed to one of said components by a member extending downwardly from said one of said components, and an annular blade affixed to the other of said adjacent components and extending downwardly so as to be suspended within said trough, such that said downwardly extending member and downwardly extending blade traverse the region occupied by said cover gas and said upper coolant pool surface, and extend into said liquid coolant pool.

2. The reactor of claim 1 wherein said pool has an operating level of said coolant during normal power operation of said reactor and a shutdown level of said coolant during reactor shutdown, said shutdown level being lower than said operating level, and wherein said trough is generally channel-shaped having two sides and a bottom, one of said sides having a top, said top being disposed at an elevation below said operating level of coolant in said vessel and said bottom being disposed above said shutdown level of coolant in said vessel.

3. The reactor of claim 1 wherein said trough is generally channel shaped having two sides and a bottom, at least one passage disposed through one of said sides, said passage being disposed at an elevation whereat said passage is immersed in said pool.

* * * * *